(12) United States Patent
Altman

(10) Patent No.: US 7,675,268 B2
(45) Date of Patent: Mar. 9, 2010

(54) POST-CHARGE BATTERY MAINTENANCE

(75) Inventor: Roger Altman, Ellisburg, NY (US)

(73) Assignee: Canadus Power Systems, LLC, Warrensville Hts., OH (US)

( * ) Notice: Subject to any disclaimer, the term of this patent is extended or adjusted under 35 U.S.C. 154(b) by 333 days.

(21) Appl. No.: 11/638,714

(22) Filed: Dec. 14, 2006

(65) Prior Publication Data

US 2008/0143299 A1      Jun. 19, 2008

(51) Int. Cl.
*H02J 7/04* (2006.01)
(52) U.S. Cl. .................................................. 320/139
(58) Field of Classification Search .................. 320/118, 320/119, 123, 127, 131, 135, 136, 137, 139, 320/140; 324/430, 432, 433
See application file for complete search history.

(56) References Cited

U.S. PATENT DOCUMENTS

| | | | | | |
|---|---|---|---|---|---|
| 3,510,746 | A | * | 5/1970 | Haruhisa et al. ............ | 320/139 |
| 3,963,976 | A | * | 6/1976 | Clark ......................... | 320/139 |
| 4,355,275 | A | * | 10/1982 | Anglin ....................... | 320/105 |
| 5,648,714 | A | | 7/1997 | Eryou et al. | |
| 5,656,920 | A | * | 8/1997 | Cherng et al. ............... | 320/161 |
| 5,742,148 | A | * | 4/1998 | Sudo et al. .................. | 320/134 |
| 6,163,131 | A | * | 12/2000 | Gartstein et al. ............ | 320/118 |

* cited by examiner

*Primary Examiner*—Edward Tso
*Assistant Examiner*—M'Baye Diao
(74) *Attorney, Agent, or Firm*—Thompson Hine LLP

(57) ABSTRACT

A battery maintenance system including a battery, an electrical pulsation device configured to supply electrical pulsation energy to the battery during at least one pulsation period, a battery charger configured to transfer electrical energy to the battery during at least one charging period and a schedule configured for scheduling operation of the electrical pulsation device and the battery charger such that there is substantially no overlap between the pulsation period and the charging period.

14 Claims, 12 Drawing Sheets

POST-CHARGE BATTERY MAINTENANCE

BACKGROUND

This application generally relates to a system and method for maintaining one or more batteries and, more particularly, to an improved system and method for strengthening the charged cell voltage of the weakest cells of a battery above that of the strongest cells of the battery in order to improve the performance of older batteries and to prolong the useful life of such batteries as well as that of new batteries.

The act of charging and discharging a battery is referred to as a charge/discharge cycle. In an industrial environment, a battery typically undergoes a charge/discharge cycle during each 24 hour period. An industrial battery often undergoes more than a thousand charge/discharge cycles during its useful lifetime. Typically, the performance of a battery with respect to its voltage strength and an associated stored charge degrades over its useful lifetime.

SUMMARY

In one aspect, a battery maintenance system includes a battery, an electrical pulsation device configured to supply electrical pulsation energy to the battery during at least one pulsation period, a battery charger configured to transfer electrical energy to the battery during at least one charging period and a schedule configured for scheduling operation of the electrical pulsation device and the battery charger such that there is substantially no overlap between the pulsation period and the charging period.

In another aspect, a method for removing deposits from the plates of a cell includes the steps of determining whether the battery is being charged from an outside source and, when the battery is not being charged from an outside source, applying an electrical pulsation energy to the battery for at least one pulsation period.

Other aspects of the disclosed system and method for improved maintenance of batteries will become apparent from the following description, the accompanying drawings and the appended claims.

BRIEF DESCRIPTION OF THE DRAWINGS

The present disclosure may be better understood with reference to the claims and drawings described below. The drawings are not necessarily to scale; the emphasis is instead placed upon illustrating the principles of the disclosed system and method. Within the drawings, like reference numbers may be used to indicate like parts throughout the various views. Differences between like parts may cause those like parts to be each indicated by different reference numbers. Unlike parts may be indicated by different reference numbers.

DETAILED DESCRIPTION

Figure 1A:
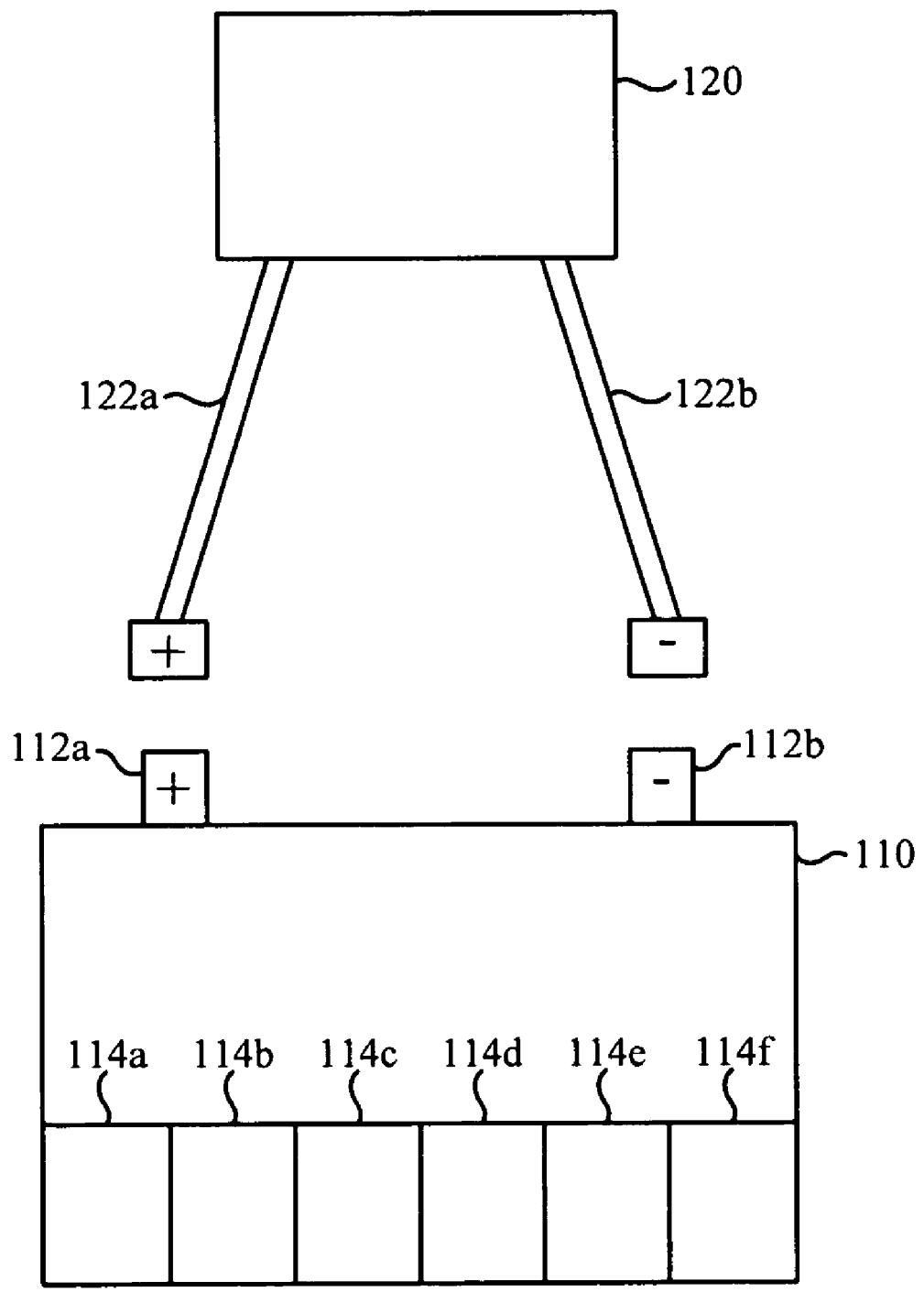
FIG. 1A is a simplified block diagram of a twelve volt battery and a battery charger device.

FIG. 1A is a simplified block diagram of a 12-volt battery 110 and a battery charger 120. The battery 110 is configured to store an electrical charge. The battery charger 120 is configured to transfer an electrical charge into the battery 110, the act of which may be referred to as "charging the battery." While charging the battery 110, a positive terminal 122a and negative terminal 122b of the battery charger 120 may be respectively connected to a corresponding positive terminal 112a and negative terminal 112b of the battery 110. The electrical charge may transfer from the charger 120 into the 110 battery via the flow of electrical current that travels through the terminals 122a, 122b, 112a, 112b.

The battery 110 may include six cells 114a-114f, also referred to as battery cells, disposed within the battery 110. The cells 114a-114f may be electrically connected in series (not shown). Each battery cell 114a-114f may be configured to store an electrical charge and may produce a cell output voltage that is slightly greater than 2 volts when fully charged. The total output voltage of the battery 110 may be the summation of the output voltages of the six individual battery cells 114a-114f.

As used herein, "battery" refers to any battery that has one or more crystalline or non-crystalline discharge phases. For example, the battery 110 may be a lead acid battery that develops a lead sulfate deposit.

Figure 1B:
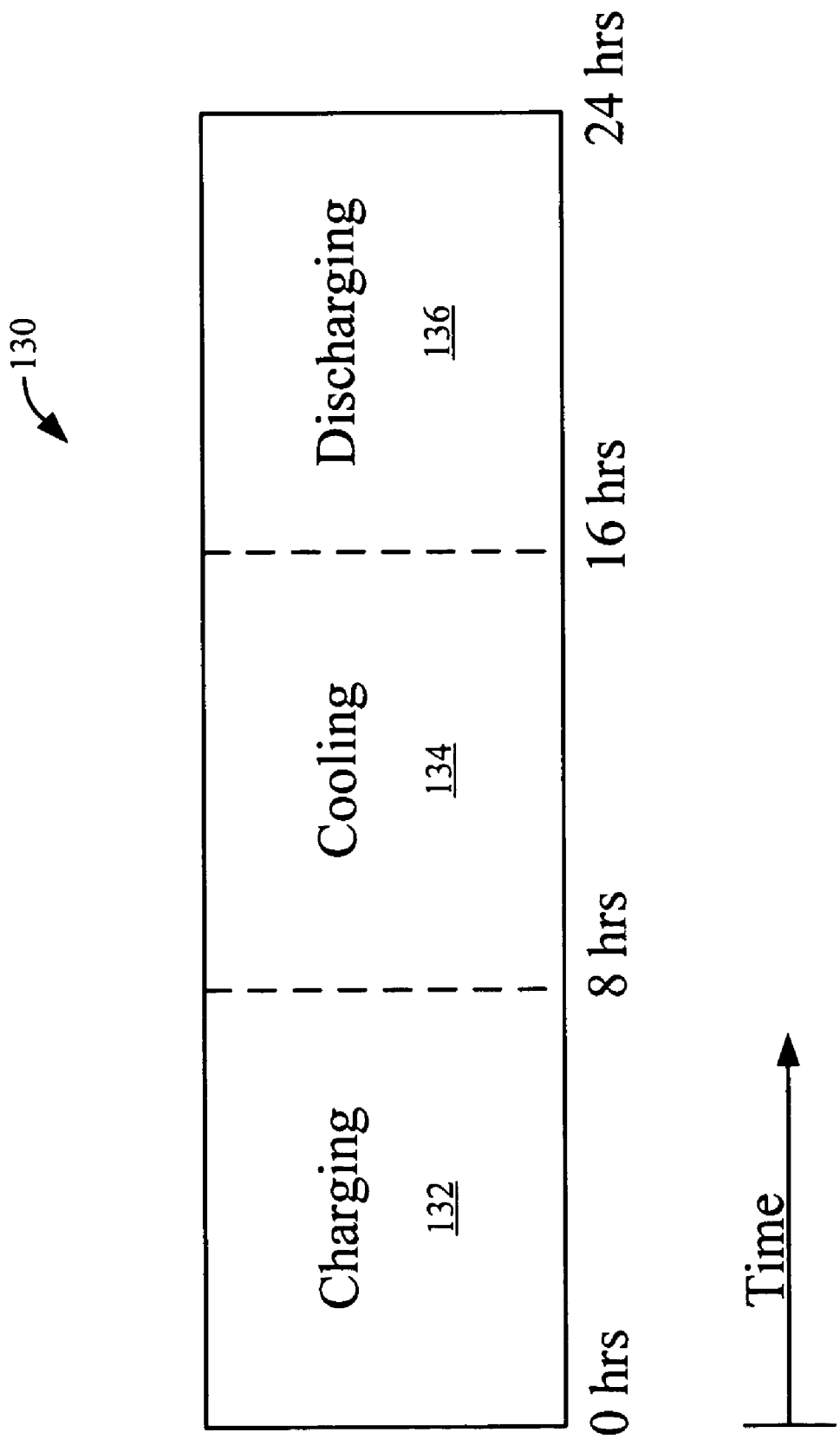
FIG. 1B is an example block diagram of a typical battery charge/discharge cycle that occurs over a twenty-four hour period and that excludes electrical pulsation activity.

FIG. 1B is an exemplary block diagram of a typical battery charge/discharge cycle 130 that occurs over a 24 hour period and that excludes electrical pulsation activity. As shown, the battery 110 (FIG. 1A) may be charged for a period of time, referred to as a charging period 132 (e.g., approximately 8 hours). Next, the battery may be allowed to cool for a period of time during the cool-down period 134 (e.g., approximately 8 hours). Next, the battery may be discharged during a discharging period 136 to provide power for some purpose, such as for providing power to industrial equipment such as a lift truck. For example, the discharging period 136 may be approximately 8 hours.

The above described charge/discharge cycle 130 may be repeated in series over many consecutive working days. Within a consecutive series of charge/discharge cycles, individual charge/discharge cycles may be distinguished using the adjectives prior, current and subsequent. Hence, the charge/discharge cycle 130 may also be referred to herein as the current charge/discharge cycle, the charging period within the current charge/discharge cycle 130 may also be referred to herein as the current charging period, the cool-down period within the current charge/discharge cycle 130 may also be referred to herein as the current cool-down period, and the discharge period within the current charge/discharge cycle 130 may also be referred to herein as the current discharge period.

The current charging period may be preceded by a discharging period of a previous charge/discharge cycle 130, referred to herein as the previous discharge period. The discharge period of the current charge/discharge cycle may be followed by another charge period of a subsequent charge/discharge cycle, also referred to herein as the subsequent charge period.

A cell output voltage is the voltage associated with a current that can be supplied by the cell at a point in time. In other words, the voltage associated with a given current that is discharged from the cell at a point in time is equal to the cell output voltage. As current is discharged from a cell, the voltage of the discharged current decreases slowly over time. The minimum cell output voltage during a discharge period is the cell output voltage that exists at the end (termination) of the discharge period.

The amount of charge that is discharged from a cell should be limited in order to avoid damage to the cell 114a-114f and the battery 110. Limiting the amount of charge that is transferred (discharged) from the cell 114a-114f may also limit the total decrease of the cell output voltage during discharge of the cell. As a general rule, the maximum discharge level is specified by the battery manufacturer. In the case of deep-cycle, lead-acid batteries, the maximum discharge level should be no more than approximately 80 percent discharge to avoid damage to the cell.

While charging a battery 110, the charger 120 supplies a charging input voltage to the current being transferred into a cell. To transfer a charge into the cell 114a-114f of the battery 110, the charge input voltage is greater than the cell output voltage in order to generate a positive net voltage into the cell 114a-114f and to overcome resistance to the flow of charge into the cell.

While the cell is being charged during each charge period, the amount of stored charge within a cell and the cell output voltage for the cell increases. The maximum cell output voltage that occurs during a charge period is the cell output voltage that exists at the end (termination) of the charge period.

Also, as the amount of stored charge within the cell increases, the resistance to the flow of charge into the cell may also increase. Hence, the difference between the charge input voltage and the cell output voltage, also referred to as the net voltage into the cell, may be increased as the amount of the charge stored within the cell increases in order to fully charge each cell of a battery.

Note that after termination of the charging period, the cell output voltage during the subsequent cooling period may be less than the maximum cell voltage during the charge period. While the battery cools during the cool-down period, sulfuric acid diffusion away from the plates of each cell may result in a cell voltage decline below the maximum cell voltage during the charging period.

The cell output voltage for a cell decreases while the cell is being discharged during each discharge period. The minimum cell output voltage that occurs during a discharge period is the cell output voltage that exists at the termination of the discharge period.

Figure 1C:
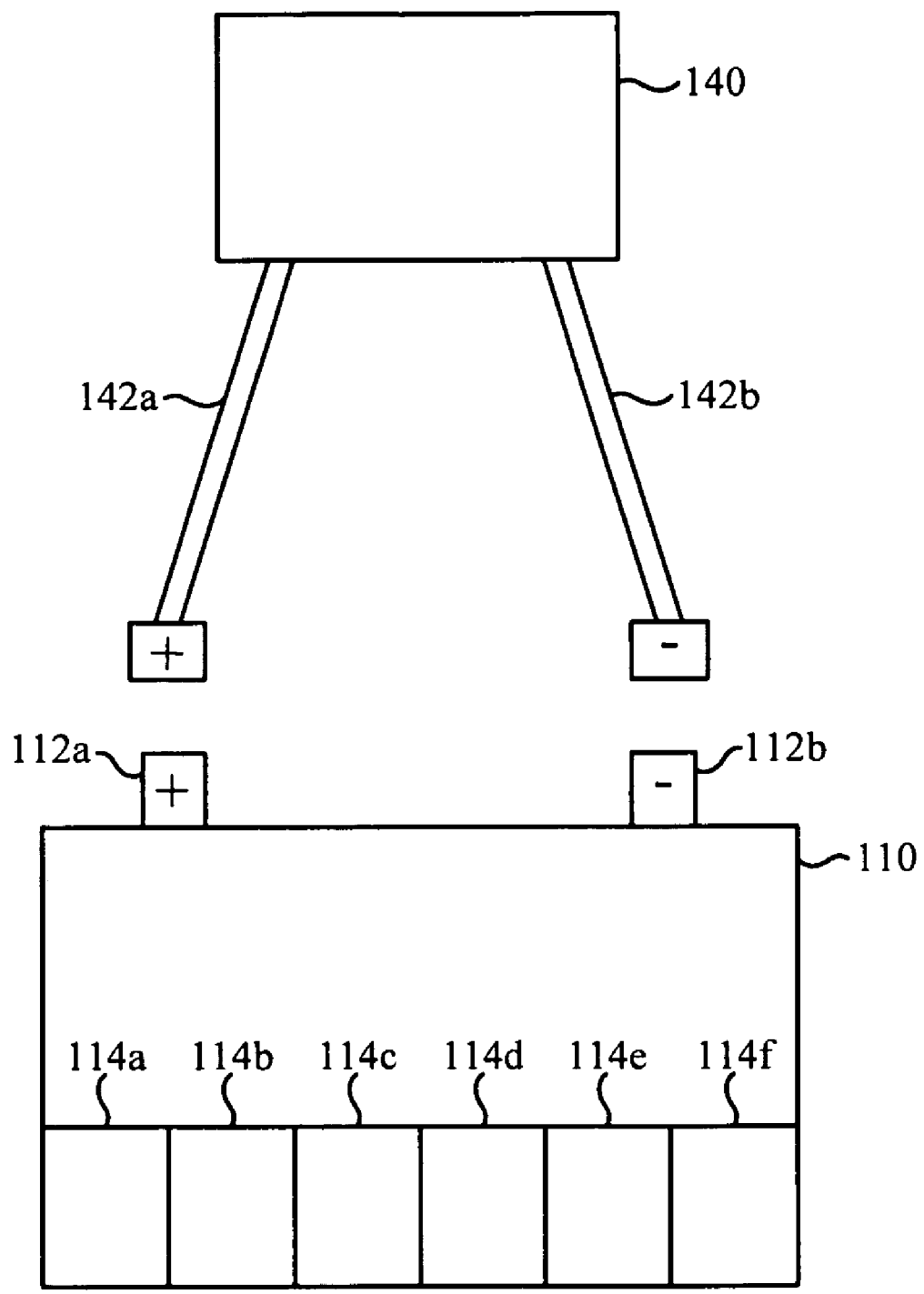
FIG. 1C is a simplified block diagram of a twelve volt battery and an electrical pulsation device.
Figure 1D:
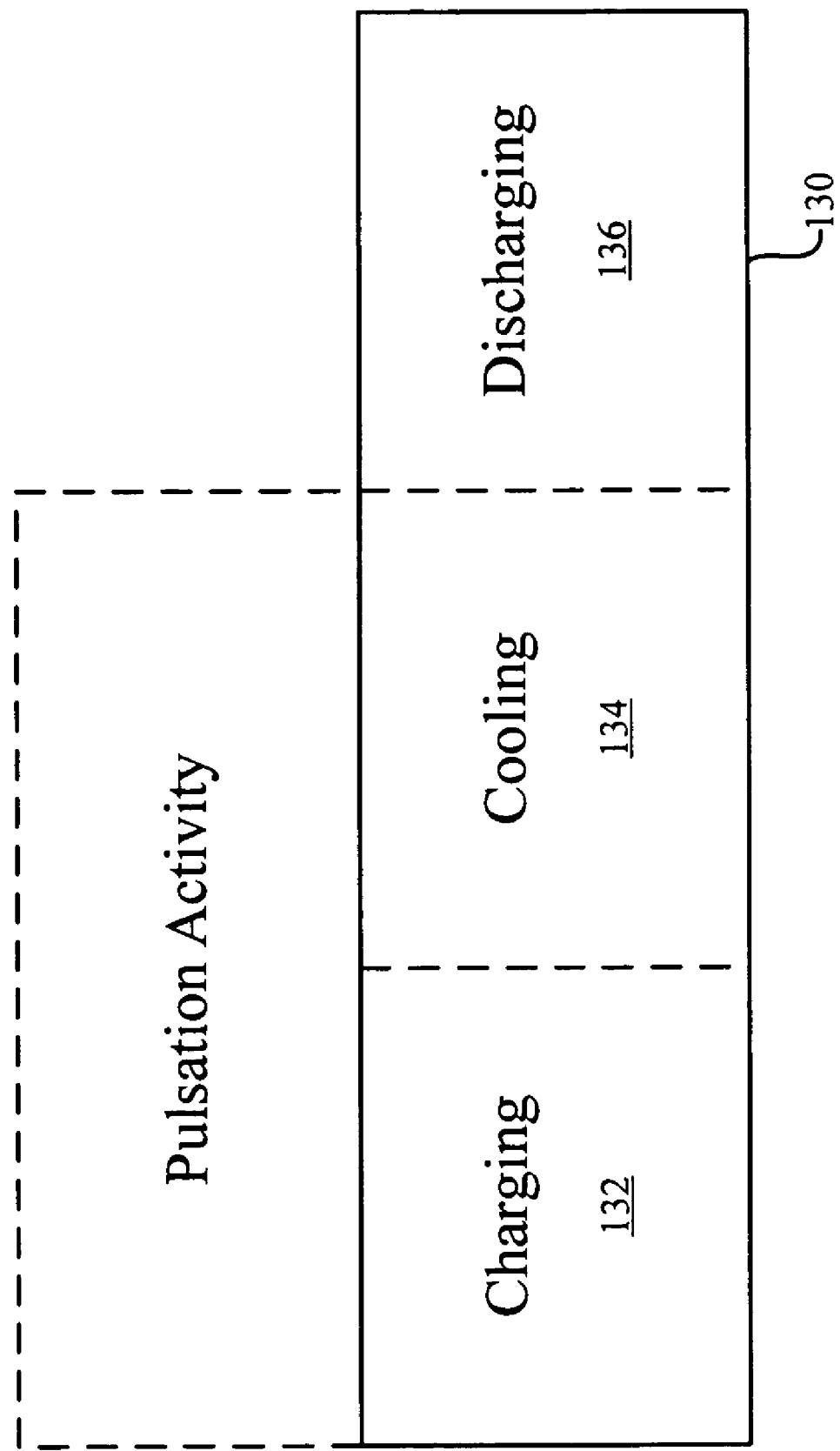
FIG. 1D is a simplified block diagram of a typical battery charge/discharge cycle that occurs over a twenty-four hour period and that includes an example of prior art electrical pulsation.

FIG. 1C is a simplified block diagram of a twelve volt battery 110 and an electrical pulsation device 140 having positive and negative terminals 142a, 142b. FIG. 1D is a simplified block diagram of a typical battery charge/discharge cycle 130 that occurs over a twenty-four hour period and that includes prior art electrical pulsation.

Figure 2A:
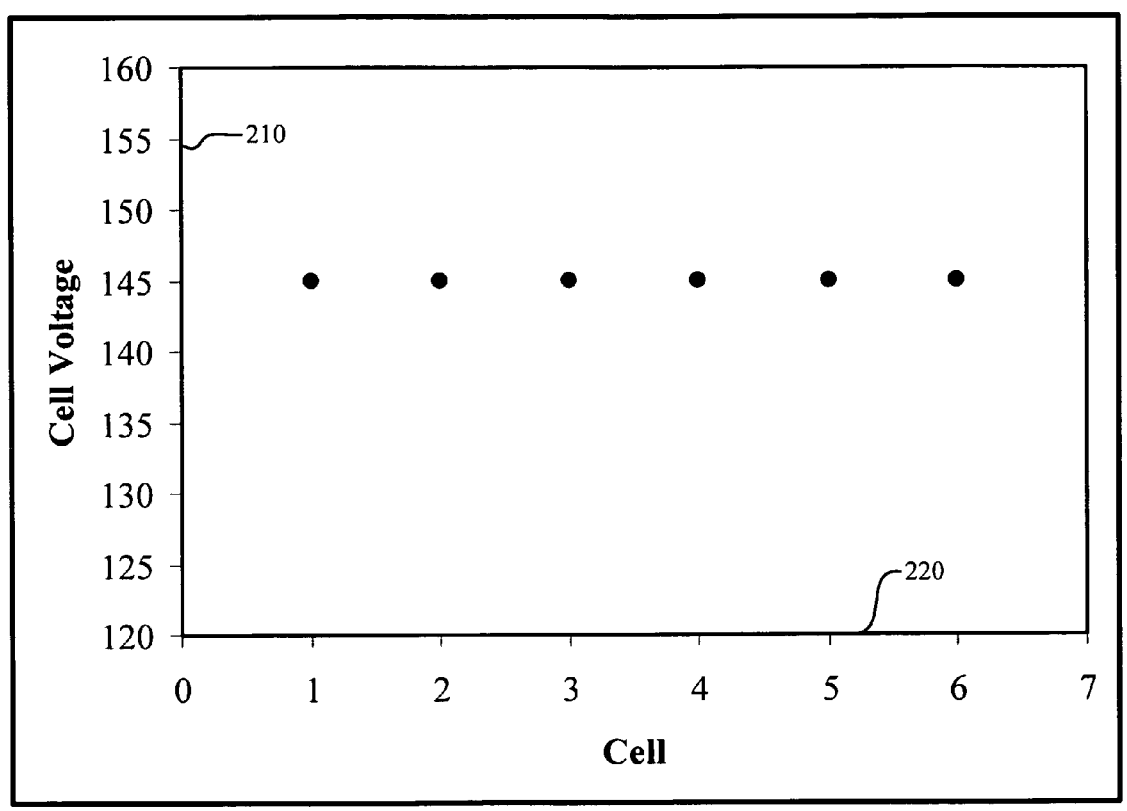
FIG. 2A illustrates an example of a graph of typical charged cell voltage values for cells of a newly manufactured battery, wherein the cell rest voltage on the vertical axis has been truncated to equal the number of millivolts above 2 volts.

FIG. 2A is a graphical illustration of typical cell rest voltage values for cells 114a-114f of a newly manufactured battery 110. As used herein, "rest voltage" may refer to the open circuit voltage of a cell or battery after sufficient time has elapsed to allow the acid concentration in the pores of the plates to generally equal the electrolyte concentration in the bulk fluid. As shown, the graph indicates the cell voltage for each cell 114a-114f of a 12-volt battery 110 and includes a vertical axis 210 and a horizontal axis 220. The vertical axis 210 indicates a cell voltage for each cell 114a-114f of the battery as a number of millivolts greater than a reference voltage equal to 2.0 volts. The horizontal axis 220 indicates a unique index identifier (1-6) corresponding to each of the six cells 114a-114f of the 12-volt battery 110. As shown, the cell voltage for each of the cells 114a-114f of the battery 110 is represented as being 145 millivolts greater than 2.0 volts, which equals a cell voltage value of 2.145 volts for each of the cells 114a-114f.

Figure 2B:
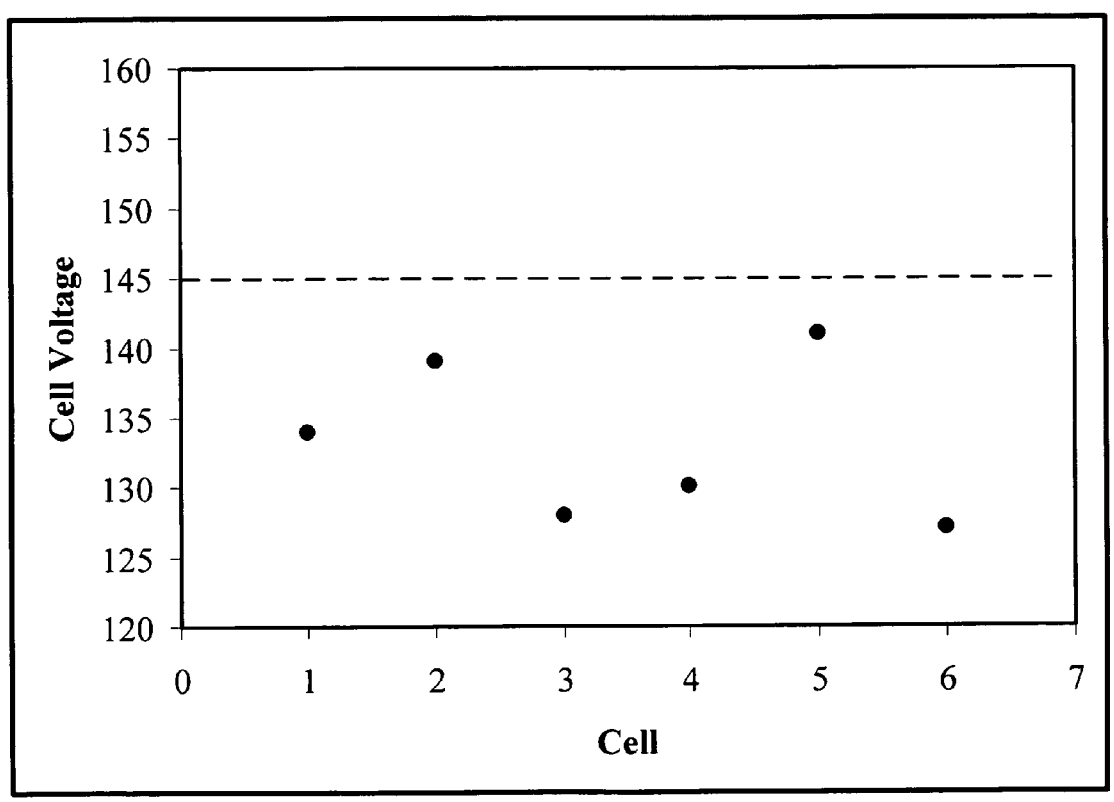
FIG. 2B illustrates the charged cell rest voltage values for cells of the battery of FIG. 1A after a significant period of battery use.

FIG. 2B is a graphical illustration of cell voltage values for the cells 114a-114f of the battery 110 after a period of battery use. Notice that the cell voltage indicated for each of the cells (1-6) 114a-114f is lower by at least a small amount as compared to the cell voltage values shown in FIG. 2A. As shown, the cell voltage values for the cells 114a-114f are 134, 139, 128, 130, 141 and 127 millivolts, respectively. After the period of battery use, cell 1 (114a) lost 11 millivolts, cell 2 (114b) lost 6 millivolts, cell 3 (114c) lost 17 millivolts, cell 4 (114d) lost 15 millivolts, cell 5 (114e) lost 4 millivolts and cell 6 (114f) lost 18 millivolts.

Figure 2C:
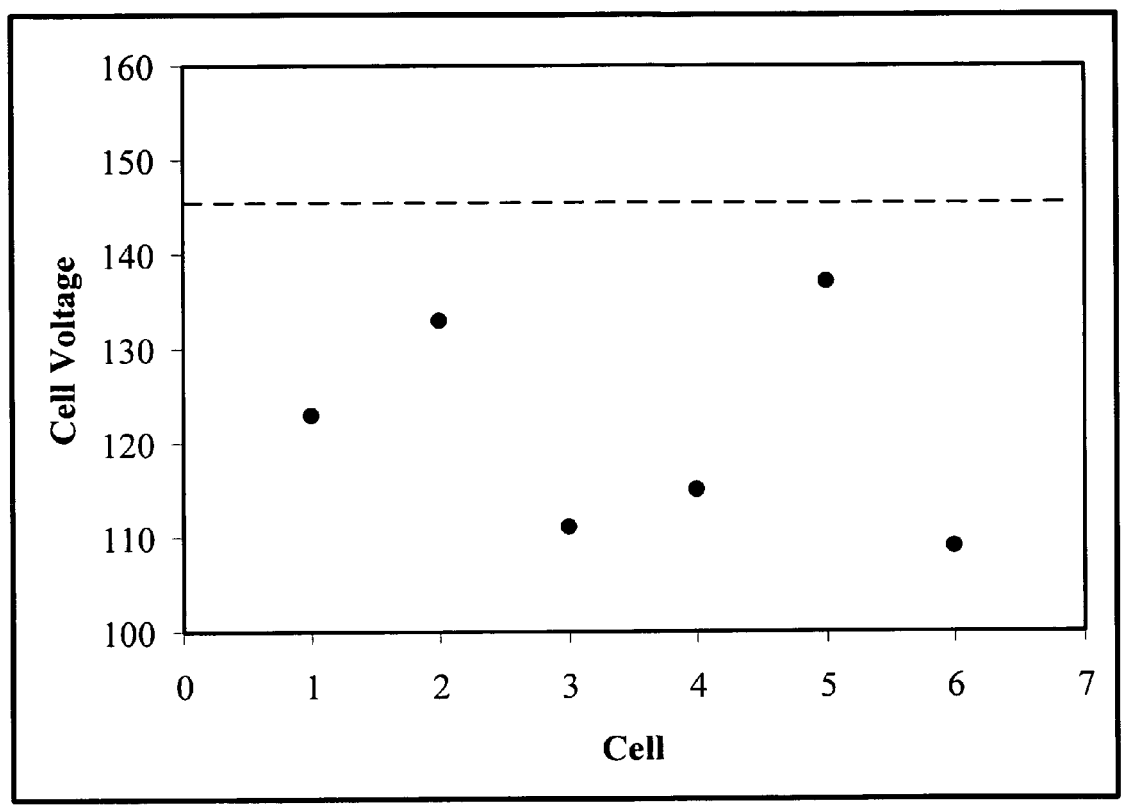
FIG. 2C illustrates the charged cell rest voltage values for cells of the battery of FIGS. 1A and 1B after further battery use.

FIG. 2C is a graphical illustration of cell voltage values for the cells 114a-114f of the battery 110 after a further significant period of battery use. Notice that each indicated cell output voltage for each of the cells (1-6) 114a-114f is lower by a further amount as compared to each of the corresponding cell output voltage of FIG. 2B. As shown, each cell output voltage, as compared to that of FIG. 2A, has been reduced by about twice the amount of the reduction shown in FIG. 2B.

As shown in FIG. 2C, the cell voltages for cells (1) through (6) are 123, 133, 111, 115, 137 and 109 millivolts respectively. After further battery use, the cell output voltage of cell (1) has been reduced by a total of 22 millivolts, the cell output voltage of cell (2) has been reduced by a total of 12 millivolts, the cell output voltage of cell (3) has been reduced by a total of 34 millivolts, the cell output voltage of cell (4) has been reduced by a total of 30 millivolts, the cell output voltage of cell (5) has been reduced by a total of 8 millivolts and the cell output voltage of cell (6) has been reduced by a total of 36 millivolts.

Notice that the range of cell voltages for each of the six cells expands during normal use. For example, as shown in FIG. 2B, cell (5) has the highest cell output voltage equal to 141 millivolts while cell (6) has the lowest cell output voltage equal to 127 millivolts. Hence, as shown in FIG. 2B, the largest difference in cell output voltage is (141−127)=14 millivolts. But as shown in FIG. 2C, cell (5) continues to have the highest cell output voltage equal to 137 millivolts and cell (6)

continues to have the lowest cell output voltage equal to 109 millivolts. Hence, as shown in FIG. 2C, the largest difference in cell output voltage is (137−109)=28 millivolts.

As shown in FIGS. 2B and 2C, the largest differences of cell output voltage strength among the cells within the battery 110 expands over time. In other words, relatively weak cells can further weaken at a faster rate (millivolt reduction per unit time) relative to that of the stronger cells when the battery undergoes normal use and prior art pulsation.

The above described effect is hereafter referred to as a "weak cell effect." The weak cell effect influences the performance of a battery throughout its useful life and influences the length of the battery's useful life.

Generally, a cell may be considered "dead" when its cell output voltage is reduced to a level specified by the battery manufacturer. In the case of lead-acid batteries, that level may be approximately 2.0 volts or less, which is represented as 0 millivolts on the vertical axis of the graphs of FIGS. 2A-2C. A battery 110 that includes at least one such "dead cell" may also generally be considered inadequate to perform the work expected of an industrial battery. As a result, a battery 110 including at least one dead cell 114a-112f is typically transferred out of a working cycle and either repaired by having the dead cell replaced, or disposed of. Analogous to the expression that a "chain is as strong as its weakest link," in some sense, a battery is as good as its weakest cell.

In one aspect, a battery 110 may be constructed from plates made from sponge lead and lead dioxide and filled with an electrolyte solution, such as a sulfuric acid and water solution. A theory regarding a correlation between normal battery use and a reduction in cell rest or equilibrium voltage identifies the proportion of lead sulfate that is produced from the electro-chemical reaction that occurs during cell discharge in battery 110, as forming lead sulfate micro-crystal deposits upon the plates within the cells 114a-112f. These lead sulfate micro-crystals grow into larger crystals, called "hard sulfate," over a series of charge/discharge cycles. Such hard sulfate deposits do not decompose during recharge and, therefore, may reduce the cell output voltage that may be supplied by a cell after it receives normal charging.

A process of applying electrical pulses to the battery, also referred to as electrical pulsation, can be employed to counteract (mitigate) at least some of the degradation of battery performance resulting from already-formed hard sulfate within the cells of a battery. A theory of operation of the electrical pulsation method is that electrical pulsation removes at least some of the deposits that have previously accumulated on the plates within the battery.

Some prior art electrical pulsation methods are known to increase the cell output voltage of one or more cells within a battery in combination with charging. The prior art electrical pulsation methods are also known to be applied to a battery during a period of time that is not separate or distinct from a period of time that is used for charging the battery and are typically intended to be initiated during charging and terminated during the cool-down period and/or the discharge period, or even never terminated.

In the prior art, electrical pulsation is sometimes initiated (triggered) upon a measured cell input charging voltage equaling a pre-determined value that occurs during a charging period and sometimes terminated upon a measured cell output voltage becoming equal to or less than a pre-determined value during the cool-down period and/or the discharge period.

A characterization of the prior art electrical pulsation methods is that they generally increase cell output voltage of cells within the battery in a manner that favors stronger cells over weaker cells. The prior art pulsation methods increase the cell output voltage of stronger cells in a greater amount (increased millivolts) than the increase to the cell output voltage of the weaker cells within the same battery. As a result, prior art pulsation methods may further expand differences among the cell rest or equilibrium voltage of the strongest and weakest cells of a battery and either fail to improve weak cell output voltage, or actually weaken the cell output still further, thus reducing the performance and longevity of the battery 110.

Regular charging is a type of battery charging that is typically employed to charge batteries, but is not generally effective for reducing the differences between the voltage of the weakest and strongest fully charged cells of a battery. Regular charging is generally limited to the battery reaching a target voltage, or voltage change over a specified time perior. Failing that, some chargers are programmed to terminate charging after a fixed time period, measured from a reference voltage, such as the "gassing" voltage. The regular charging period is usually terminated at a time when battery output voltage ceases to rise over a predetermined time period (in the case of lead-acid batteries, this time period is referred to as a "dV/dT time out").

Equalization charging is a controlled overcharge in order to raise the charge level of the weakest cells as much as possible. When done periodically, equalization charging minimizes the rate at which the differences between the cell output voltage of the weakest and strongest cells of a battery expands. For lead-acid batteries, equalization charging typically occurs for an extended period of time (usually about 3 hours) beyond a regular (non-equalization) charging period.

At any point in time during charging, the charging input voltage is at a higher value than the cell output voltage for a cell being charged. Hence, the higher a cell output voltage, the higher the cell charging input voltage that is required to transfer charge into a particular cell. Also, the higher the cell output voltage, the more charge that has been stored within the cell and the more resistance there is to transfer of any further charge into a cell.

Equalization charging typically charges a battery for a fixed period of time beyond that of a normal charge. Such charging ensures that the cell charging voltage exceeds the voltage that causes gassing within the cell, usually over several hours. Gassing is an electro-chemical reaction within the cell whereby the water component of the electrolyte electro-chemically dissociates into hydrogen and oxygen. Prolonged gassing can cause damage within the cell and is a reason for only periodic use of equalization charging.

The larger the difference between the cell output voltage of the strongest and weakest cells, the more likely that equalization charging will cause excessive gassing of the strongest cells in a lead-acid battery. Essentially, equalization charging can degrade the strongest cells while attempting to raise the charge level of the weakest cells of the battery 110. Gassing typically occurs when the cell input charging voltage rises to about 2.37 volts. An input charging voltage in excess of 2.37 volts typically would be employed in order to continue the transfer of charge into a cell that may reach approximately 2.52 volts or higher before charge termination.

In a typical extended charging scenario, deposits of microcrystalline lead sulfate that have accumulated on the stronger cells before charging are substantially or completely depleted after charging, while deposits of microcrystalline lead sulfate that have accumulated on weaker cells before charging are present in greater amounts before charging and, therefore, less depletion occurs during charging since charge time is the same for both weak and strong cells. The larger deposits of microcrystalline lead sulfate on the weaker cells slowly reverts to "hard (macrocrystalline) lead sulfate," which acts as an electrical insulator, thus restricting the rate of charge that can be added to those cells during subsequent charging periods. This crystal growth creates a vicious cycle that renders weak cells weaker as the strongest cells become progressively overcharged.

Figure 3A:
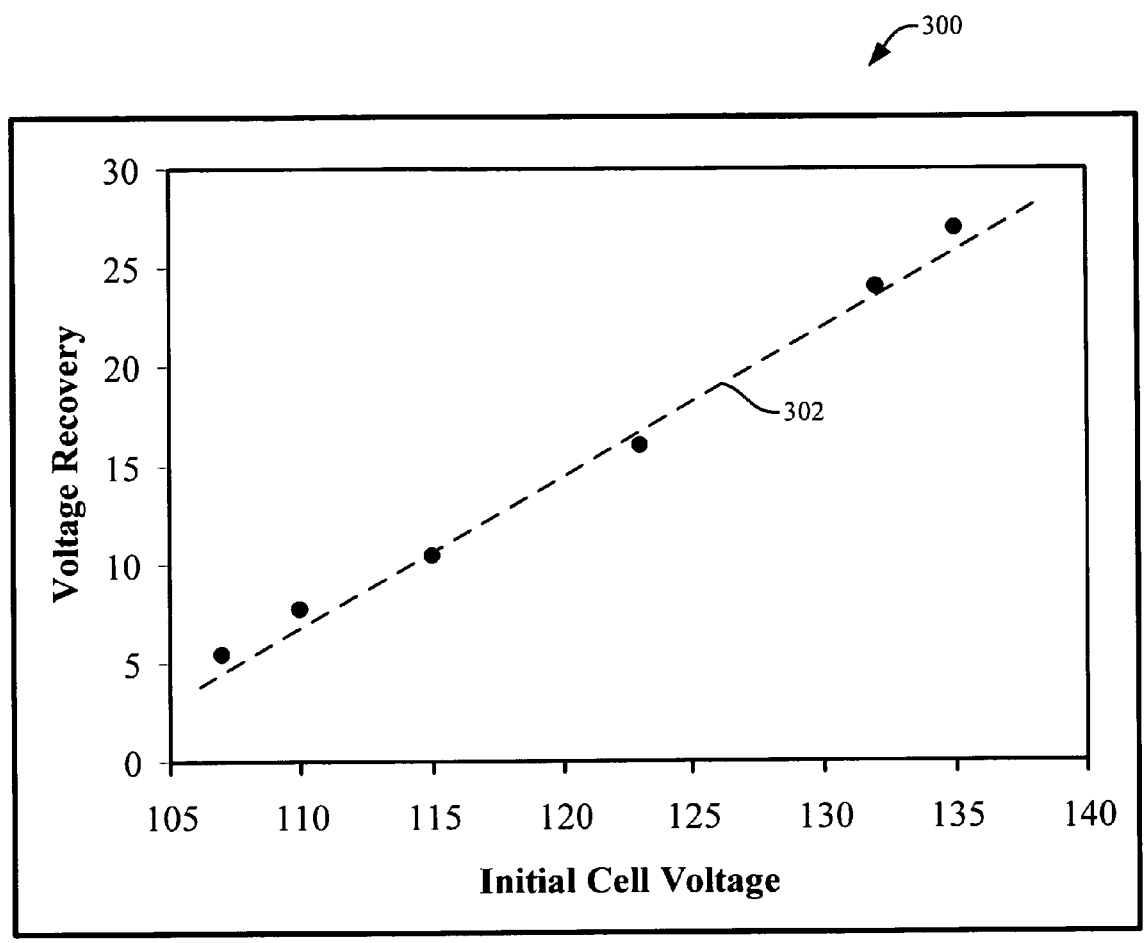
FIG. 3A illustrates an example of a graph representing voltage recovery of charged cell rest voltage values for a battery receiving a typical prior art electrical pulsation of FIG. 1D.

FIG. 3A illustrates a graph representing voltage recovery of charged cell rest voltage values for a battery 110 receiving typical prior art electrical pulsation activity shown in FIG. 1D. The graph includes typical, but not actual data. A trend line 302 indicates an average voltage recovery as a function of the initial cell voltage for each cell. The trend line 302 may by computed from a set of individual rest voltage recovery values for a plurality of cells. Each cell has a separate initial cell voltage after charging. The average voltage recovery as a function of initial cell voltage above 2.0 volts is shown. As shown, the voltage recovery is less for the weakest cells compared to the strongest cells.

The percent voltage recovery value for each cell may be computed as follows:

Percent Voltage Recovery=Final Cell Voltage−Initial Cell Voltage/Initial Cell Voltage×100

The final cell voltage is a cell voltage above 2.0 volts that is measured after re-charging and applying electrical pulsation to the cell. The initial cell voltage is a cell voltage above 2.0 volts that is measured before applying electrical pulsation to the cell. For example, a cell having an initial cell voltage equal to 2.10 volts before receiving electrical pulsation and having a final cell voltage equal to 2.12 volts after electrical pulsation, has realized a percent voltage recovery of 20 percent [100*(2.12−2.0)−(2.1−2.0))/(2.1−2.0) (millivolts)=20%].

Figure 3B:
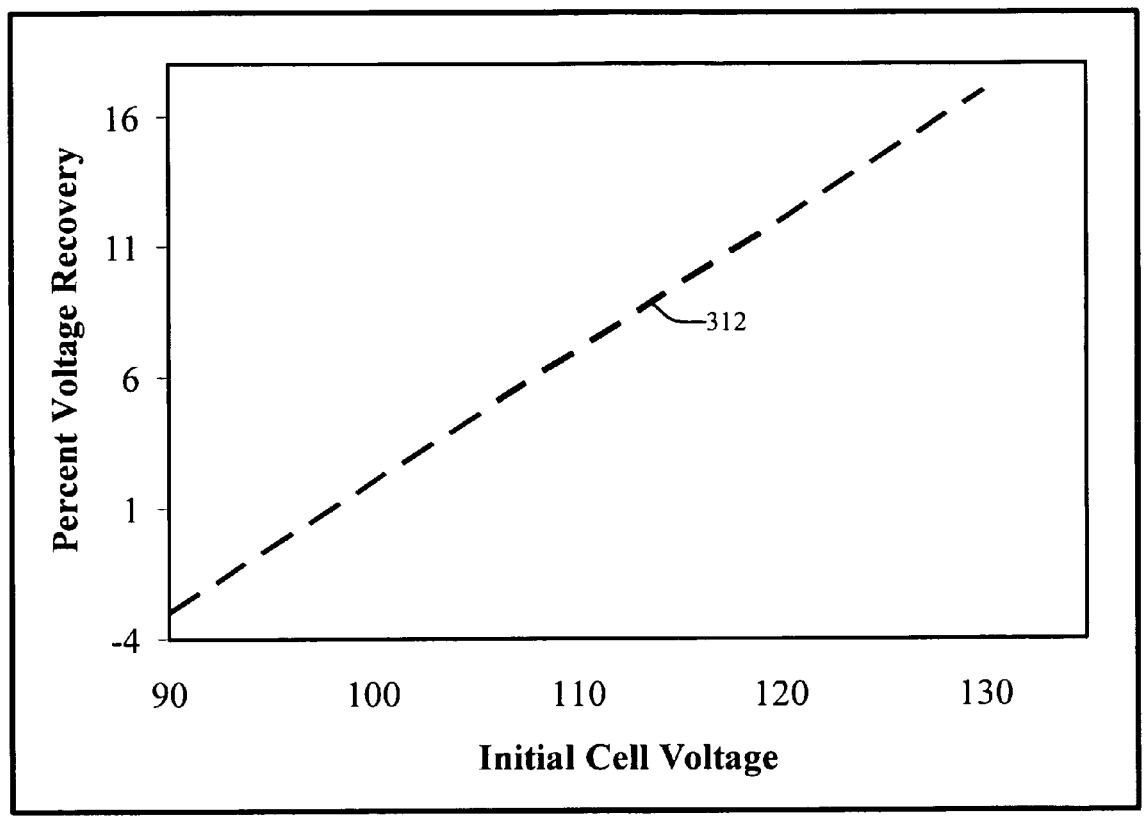
FIG. 3B illustrates an example of a graph representing percent voltage recovery for the charged cell rest voltage values for FIG. 3A.

FIG. 3B illustrates an example of a graph representing actual percent voltage recovery values for the charged cell voltage values for FIG. 3A. The actual voltage recovery as a function of initial cell voltage above 2.0 volts is shown. Percent voltage recovery is computed from each baseline cell rest voltage and from the actual voltage recovery values in FIG. 3A.

As shown in FIG. 3B, the trend line 312 of percent voltage recovery rises with increasing initial cell voltage above 2.0 volts. For example, the percent voltage recovery value for a cell having an initial cell voltage equal to 90 millivolts is approximately −3.5% and the value for a cell having an initial cell voltage equal to 120 millivolts is approximately +11.5%. The actual voltage recovery is computed as follows:

Actual Voltage Recovery=Final Cell Voltage−Initial Cell Voltage

Actual Voltage Recovery=Initial Cell Voltage*Percent Voltage Recovery

Final Cell Voltage=Initial Cell Voltage*(1+Percent Voltage Recovery)

For example, a cell having an initial cell voltage equal to 2.10 volts before receiving electrical pulsation and re-charging and having a final cell voltage equal to 2.136 volts after electrical pulsation and re-charging has realized a voltage recovery of (2.136−2.10)=0.036 volts (36 millivolts).

As indicated by the examples above, the actual cell percent voltage recovery is higher for cells having a higher initial cell voltage than for cells having a lower initial cell voltage, on average. In other words, with respect to average voltage recovery, the weaker cells benefit less, and may actually lose voltage from electrical pulsation compared to the voltage gain for the stronger cells.

Figure 4A:
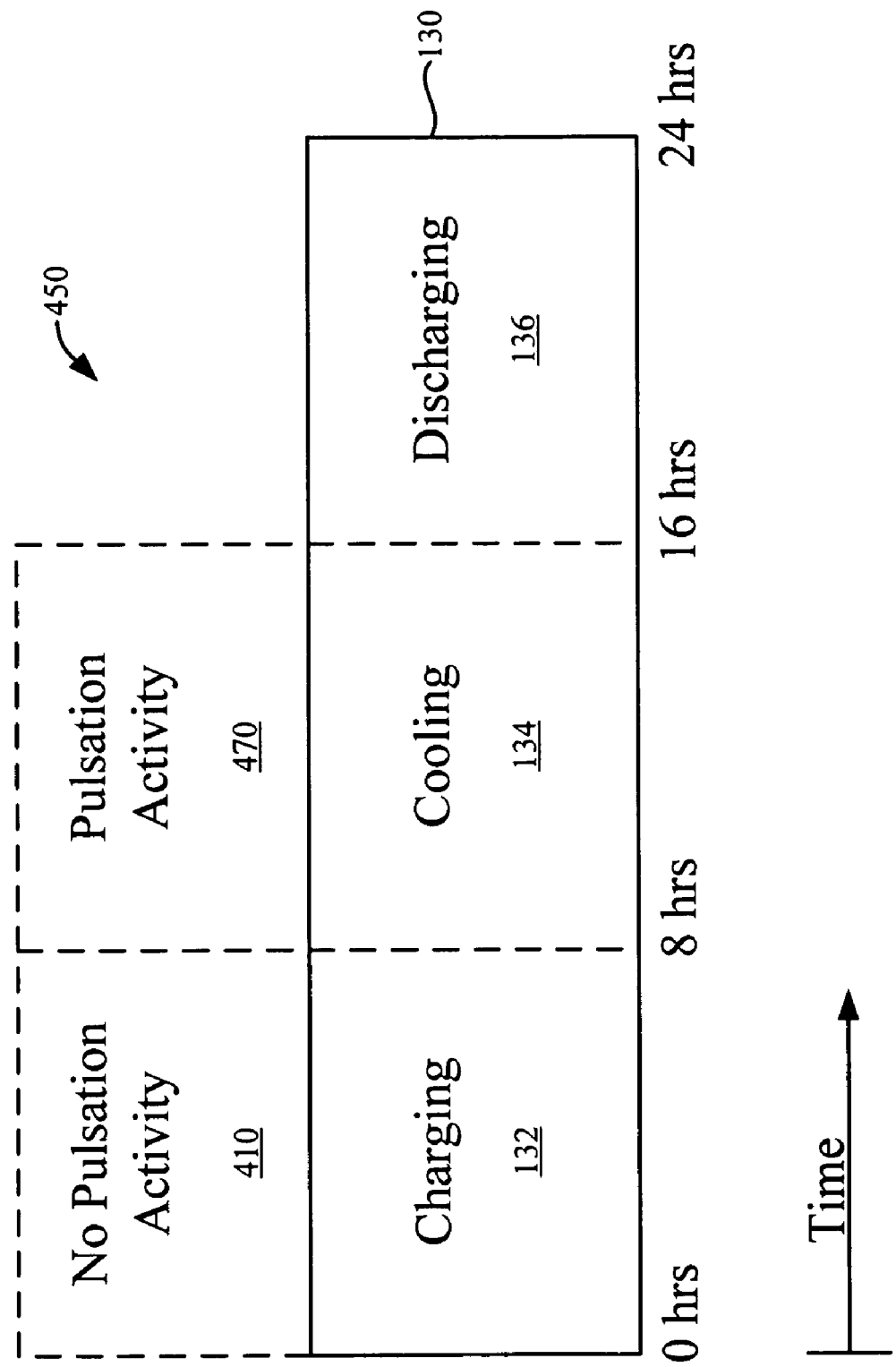
FIG. 4A is an example block diagram of a typical battery charge/discharge cycle that occurs over a twenty-four hour period that includes electrical pulsation activity in accordance with an aspect of the disclosed system and method.

FIG. 4A is an example block diagram of a battery charge/discharge cycle 130 that occurs over a twenty-four hour period and that includes improved electrical pulsation activity 470 in accordance with the invention. A charge/discharge cycle 130 is as described for FIG. 1D and includes a charging period 132, a cooling period 134 and a discharging period 136, and may be repeated in series over many consecutive working days.

Unlike the prior art electrical pulsation activity 170 described for FIG. 1D, the improved electrical pulsation activity 470 is scheduled to occur generally outside of the period of time of the charging period 132 with minimal or no overlap. In other words, the charging activity 132 and the improved electrical pulsation activity 470 may be performed in a generally mutually exclusive arrangement with respect to time.

Generally, no electrical pulsation activity 410 occurs when charging 132 occurs and no charging activity 132 occurs when the improved electrical pulsation activity 470 occurs. However, those skilled in the art will appreciate that some overlap of charging activity and pulsation activity may be tolerated without departing from the scope of the present disclosure.

In one aspect, at least 80 percent of the charging cycle is performed without electrical pulsation activity and at least 80 percent of the pulsation activity is performed without charging activity. In another aspect, at least 50 percent of the charging cycle is performed without electrical pulsation activity and at least 50 percent of the pulsation activity is performed without charging activity.

At this point, those skilled in the art will appreciate that any reduction in the overlap of charging activity and pulsation activity will result in extended battery life as compared to the prior art. Furthermore, those skilled in the art will appreciate that a greater amount of overlap of charging activity and pulsation activity may be tolerated for new or newer batteries, while less overlap would be desirable for older batteries.

Figure 4B:
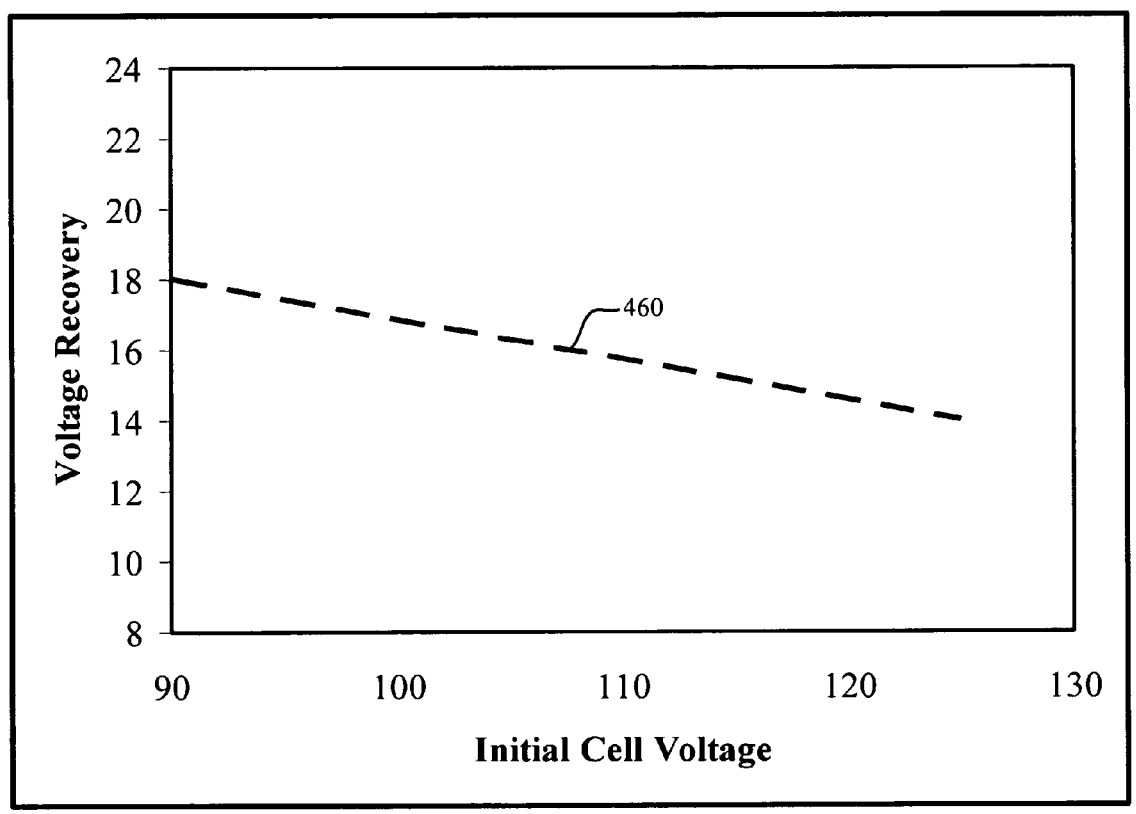
FIG. 4B illustrates an example of a graph representing voltage recovery of charged cell voltage values in accordance with the cycle illustrated in FIG. 4A.
Figure 4C:
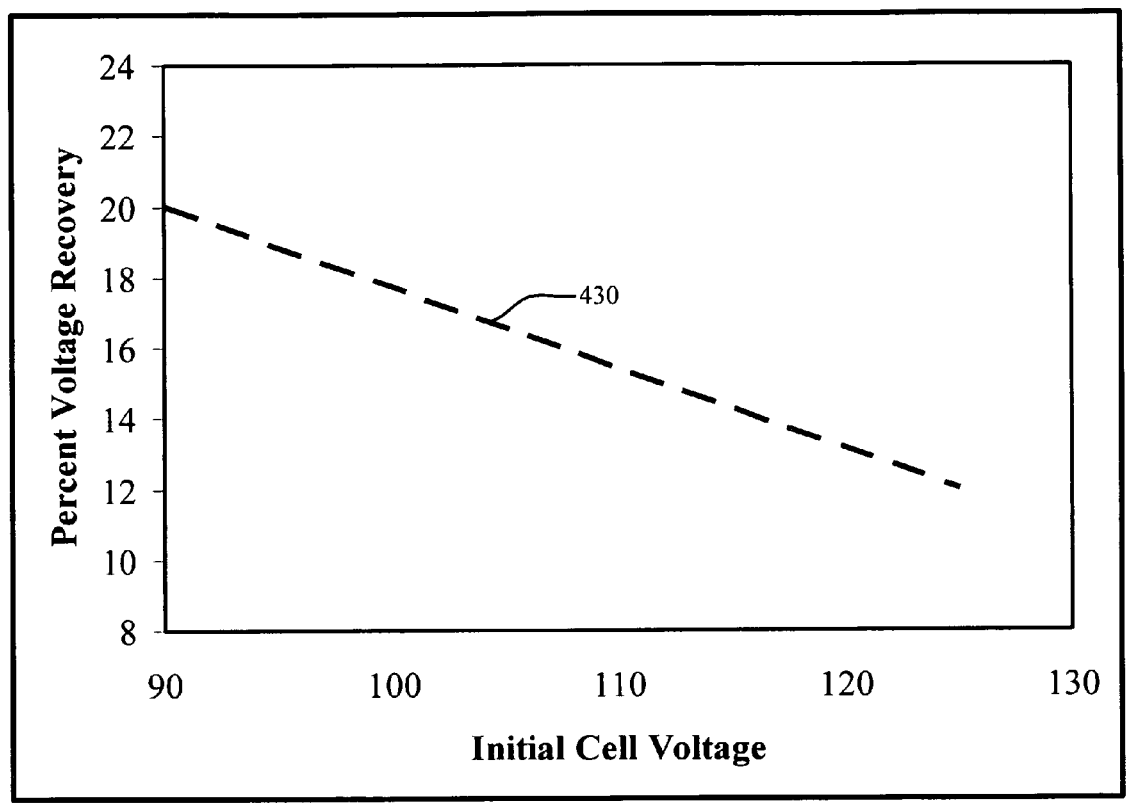
FIG. 4C illustrates an example of a graph representing percent voltage recovery of charged cell voltage values of FIG. 4B.

FIG. 4C illustrates an example of a graph representing percent voltage recovery of charged cell voltage values for a battery receiving the electrical pulsation activity 470 shown in FIG. 4A. The percent voltage recovery as a function of initial cell voltage above 2.0 volts is shown by a trend line 430.

As shown, the actual voltage recovery as a function of initial cell voltage decreases (falls) as a function of increasing initial cell voltage above 2.0 volts. The trend line 430 indicates that the percent cell voltage recovery is higher for cells having a lower initial cell voltage than for cells having a higher initial cell voltage.

FIG. 4B illustrates an example of a graph representing voltage recovery of charged cell voltage values of FIG. 4C. The voltage recovery as a function of an initial cell voltage above 2.0 volts is shown by a trend line 460. As shown, the voltage recovery substantially reduces (falls) as a function of the initial cell voltage of a cell. The trend line 460 indicates that the cell voltage recovery is higher for cells having a lower initial cell voltage than for cells having a higher initial cell voltage. In other words, the weaker cells benefit more from electrical pulsation than the stronger cells of the same battery 110.

For example, the voltage recovery value for a cell having an initial cell voltage equal to 90 millivolts is approximately equal to 18.0 millivolts, based upon a percent voltage recovery equal to 20 percent, in accordance with the trend line 460. In comparison, the voltage recovery value for a cell having an initial cell voltage equal to 120 millivolts is approximately 14.4 millivolts based upon a percent voltage recovery equal to 12 percent for a cell having an initial voltage equal to 120 millivolts above 2.0 volts.

Contrary to the performance of prior art electrical pulsation 170, performing electrical pulsation 470 in accordance with the present disclosure provides more benefit (voltage recovery) to the weaker cells of a battery relative to the benefit (voltage recovery) provided to the stronger cells 114a-114f of that same battery 110. As a result, a range of cell voltage differences between all of the cells 114a-114f of a battery 110 is reduced and the life of the battery 110 is extended relative to that of a battery treated with prior art electrical pulsation.

Considering that a cell is classified as "dead" when its cell output voltage is reduced to approximately 2.0 volts or less, and that a battery is as good as its weakest cell, the act of strengthening the weakest cell is arguably a much more effective approach to strengthening the battery itself. Further, the greater the weakest cell of a battery is above 2.0 volts, the farther the battery is from being classified as "dead." As a result, the disclosed system and method targets and strengthens a particularly vulnerable aspect of battery performance and life, essentially opposite to that of prior art practice.

In one aspect, a system to maintain one or more batteries is provided. The system may include at least one electrical pulsation device that is configured to apply electrical pulsation energy to one or more batteries in a manner that is independent of when a charge is supplied to the one or more batteries. The system also includes one or more batteries and includes a schedule that is configured for scheduling an operation of the at least one electrical pulsation device for supplying electrical pulsation energy to one or more batteries. The schedule specifies the operation of the electrical pulsation device to occur during one or more electrical pulsation periods of time and where the one or more pulsation periods of time occur while no charge is being supplied to the one or more batteries.

Optionally, the one or more pulsation periods of time is preceded by a battery charging phase. The battery charging phase can be a non-equalization charging phase or an equalization charging phase.

In some aspects, the pulsation periods of time for at least one of the one or more batteries occur periodically. In other aspects, the equalization charging phase occurs between pulsation periods that are separated by about 5 days. In other aspects, the pulsation periods of time for at least one of the one or more batteries occur no more frequently than 15 hours apart. In other aspects, the pulsation periods of time for the battery occur no more frequently than 24 hours apart.

In some aspects, the pulsations periods of time for at least one of the one or more batteries occur no more frequently than once per week. In other aspects, the pulsation periods of time for at least one of the one or more batteries occur no more frequently than every three charging cycles. In other aspects, the pulsation periods of time for at least one of the one or more batteries occur no more frequently than every five days.

In some aspects, the electrical pulsation device is configured to make a direct physical attachment to one or more batteries. In other aspects, the battery is a traction battery employed within a lift truck.

In another aspect, the disclosed method for removing deposits (e.g., lead sulfate) from the plates of one or more cells includes the steps of determining whether a battery, having a positive and negative terminal is currently receiving a charge from an outside source and, if true, terminating the receiving of a charge from an outside source or delaying further actions until the receiving of a charge from an outside source has terminated and applying electrical pulsation energy to the positive and negative terminal of the battery for one or more pulsation periods of time. The battery is not receiving a charge from an outside source during each of the pulsation periods of time.

Optionally, the one or more pulsation periods of time is preceded by a battery charging phase. The battery charging phase can be a non-equalization charging phase or an equalization charging phase.

In some aspects, the pulsation periods of time for at least one of the one or more batteries occur periodically. In other aspects, the equalization charging phase occurs between pulsation periods that are separated by about 5 days. In other aspects, the pulsation periods of time for at least one of the one or more batteries occur no more frequently than 15 hours apart. In other aspects, the pulsation periods of time for the battery occur no more frequently than 24 hours apart.

In some aspects, the pulsation periods of time for at least one of the one or more batteries occur no more frequently than once per week. In other aspects, the pulsation periods of time for at least one of the one or more batteries occur no more frequently than every three charging cycles. In other aspects, the pulsation periods of time for at least one of the one or more batteries occur no more frequently than every five days.

In some aspects, electrical pulsation energy, such as lead sulfate desulfation energy, is applied using an electrical pulsation device that is configured to make a direct physical attachment to one or more batteries. In other aspects, the battery is a traction battery employed within a lift truck.

Although various aspects of the disclosed system and method for improved maintenance of batteries have been shown and described, modifications may occur to those skilled in the art upon reading the specification. The present application includes such modifications and is limited only by the scope of the claims.

What is claimed is:

1. A battery maintenance system comprising:
   a battery;
   an electrical pulsation device configured to supply electrical pulsation energy to said battery during at least one pulsation period;
   a battery charger configured to transfer electrical energy to said battery during at least one charging period; and
   a schedule configured to operate said electrical pulsation device and said battery charger such that there is substantially no overlap between said pulsation period and said charging period.

2. The system of claim 1 wherein said electrical pulsation device and said battery charger are associated with a single pulsation/charging unit.

3. The system of claim 1 wherein said battery is a lead acid battery.

4. The system of claim 1 wherein said battery is a traction battery employed within a lift truck.

5. The system of claim 1 wherein said pulsation period is preceded by said charging period.

6. The system of claim 1 wherein said battery charger is configured to perform non-equalization charging.

7. The system of claim 1 wherein said battery charger is configured to perform equalization charging.

8. The system of claim 1 wherein said pulsation period occurs periodically.

9. The system of claim 1 wherein two of said pulsation periods occur no more frequently than 15 hours apart.

10. The system of claim 1 wherein two of said pulsation periods occur no more frequently than once per week.

11. The system of claim 1 wherein a time lapse between two consecutive ones of said pulsation periods is a function of a working age of said battery.

12. A battery maintenance system comprising:
- a battery;
- an electrical pulsation device configured to supply pulsation energy to said battery during at least one pulsation period;
- a battery charger configured to transfer electrical energy to said battery during at least one charging period; and
- a schedule configured to operate said electrical pulsation device and said battery charger such that at least about 80 percent of said charging period occurs independently of said pulsation period.

13. A method for removing a deposit from a plate of at least one cell of a battery comprising the steps of:
- supplying electrical pulsation energy to said battery during a pulsation period;
- transferring electrical energy to said battery during a charging period; and
- during said charging period, minimizing an overlap of said pulsation period with said charging period.

14. The method of claim 13 wherein said battery is a lead-acid battery and said deposit includes lead sulfate.

* * * * *